United States Patent [19]

MacMillan

[11] 4,357,552
[45] Nov. 2, 1982

[54] MOTOR ASSEMBLY

[75] Inventor: Robert E. MacMillan, Andover, Mass.

[73] Assignee: Ex-Cell-O Corporation, Troy, Mich.

[21] Appl. No.: 135,840

[22] Filed: Mar. 31, 1980

[51] Int. Cl.³ .............................................. H02K 5/16
[52] U.S. Cl. ..................................... 310/90; 308/26; 310/43; 310/42
[58] Field of Search ............. 310/40 MM, 42, 43, 89, 310/90, 91, 45, 66; 308/22, 30, 187.1, 26, 187

[56] References Cited

U.S. PATENT DOCUMENTS

| | | | |
|---|---|---|---|
| 2,096,139 | 10/1937 | Spahr | 308/30 |
| 2,249,141 | 7/1941 | Johnson | 308/187.1 |
| 3,294,992 | 12/1966 | Nelson | 310/66 |
| 3,372,960 | 3/1968 | Fisher | 308/22 |
| 3,567,973 | 3/1971 | Mastrodonato et al. | 310/89 |
| 4,049,984 | 9/1977 | Ishii et al. | 310/42 |
| 4,088,910 | 5/1978 | Frey | 310/89 |

Primary Examiner—A. T. Grimley
Assistant Examiner—D. Rebsch
Attorney, Agent, or Firm—McGlynn and Milton

[57] ABSTRACT

A motor assembly comprising a motor having a driven member extending therefrom, a housing for encasing the motor and having an opening therein such that the driven member extends through the opening. The assembly is characterized by a resilient support member disposed about the opening. The resilient support member has a passageway therethrough for providing a support for the driven member which extends through the passageway. The support member is molded about at least a portion of the housing for disposition in mechanical interlocking engagement with the housing.

11 Claims, 5 Drawing Figures

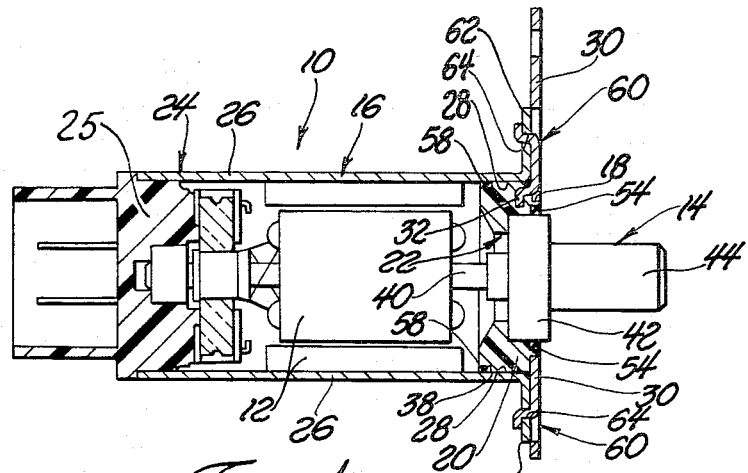
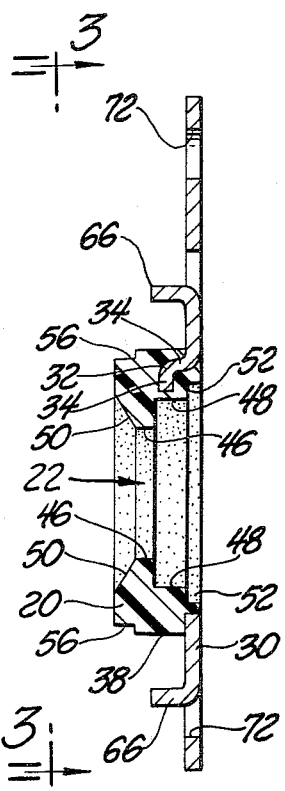
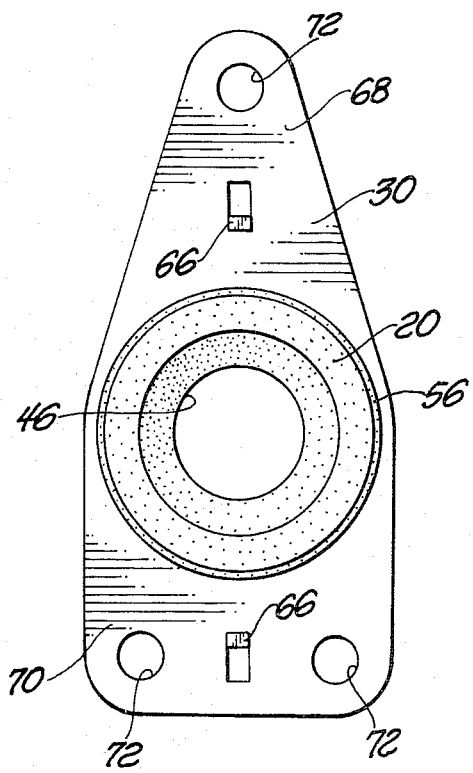
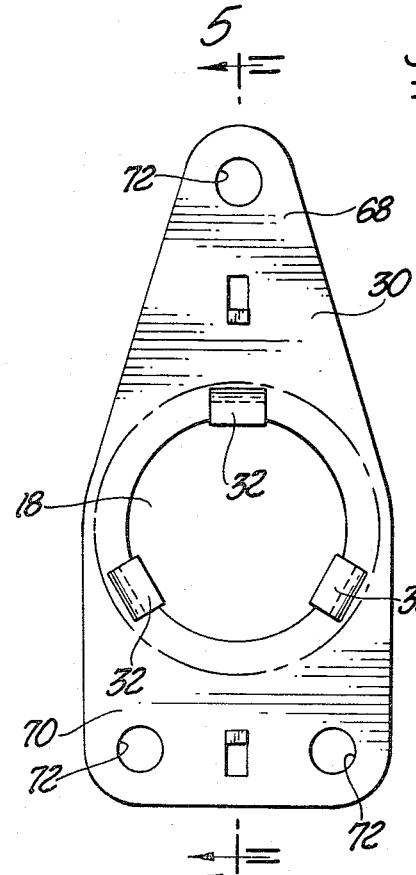
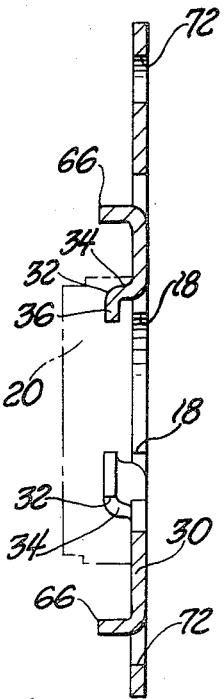

MOTOR ASSEMBLY

BACKGROUND OF THE INVENTION

1. Field of the Invention

The subject invention relates to a motor assembly such as that used for actuating a power window.

2. Description of the Prior Art

Prior art motor assemblies have included either cast iron or die cast end plates which require expensive machining to properly place a bearing within a pocket therein. This machining results in increased costs.

Steel can be stamped to form an end plate, however, the steel plate cannot be drawn to provide a sufficient surface to form an integral pocket. Therefore, the problems presented by the prior art are cost of machining casted parts, insufficient strength of the casted parts, and the inability to utilize stronger steel parts.

SUMMARY OF THE INVENTION

The instant invention provides a motor assembly comprising a motor including a driven member extending therefrom and a housing for encasing the motor and having an opening therein such that the driven member extends through the opening. The assembly is characterized by a resilient support means disposed about the opening and having a passageway therethrough for providing a support for the driven member. The driven member extends through the passageway. The support means is molded about at least a portion of the housing for disposition and mechanical interlocking engagement therewith.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 shows a longitudinal cross-sectional view of a preferred embodiment of the instant invention;

FIG. 2 is an enlarged cross-sectional view of a mounting plate constructed in accordance with the subject invention;

FIG. 3 is an elevational view of one face of the mounting plate taken substantially along lines 3—3 of FIG. 2;

FIG. 4 is an elevational view of the opposite face of the subject mounting plate; and FIG. 5 is a cross-sectional view of the subject mounting plate taken substantially along lines 5—5 of FIG. 4.

DESCRIPTION OF PREFERRED EMBODIMENT

A motor assembly constructed in accordance with the instant invention is generally shown at 10 in FIG. 1.

The preferred embodiment of the subject assembly includes a motor 12 of the type used for actuating a power window; however, the instant invention can be adapted for actuating other devices which are power-driven within a motor vehicle.

The motor assembly further comprises driven means generally indicated at 14 extending from the motor 12 and casing means generally indicated at 16 for encasing the motor 12. The casing means includes an opening 18 therein. The driven means 14 extends through the opening 18.

The motor assembly 10 is characterized by resilient support means 20 disposed about the opening 18. The resilient support means 20 has a passageway generally indicated at 22 and extending therethrough for providing a support for the driven means 14. The driven means 14 extends through the passageway 22. The support means 20 is molded about at least a portion of the casing means 16 for disposition and mechanical interlocking engagement therewith.

The casing means 16 includes a housing 24 closed at one end by a circular plastic plug 25 and having a cylindrical wall 26 disposed about the motor 12. The housing 24 includes an open end 28. The casing means 16 also includes a mounting plate 30 attached to and closing the open end 23 of the housing 24. The mounting plate 30 defines the opening 18 about which the support means 20 is disposed.

As shown in FIG. 5, the mounting plate 30 includes a plurality of projections 32 extending into the opening 18. As shown in FIG. 4, the preferred embodiment of the instant invention includes three projections 32. As shown in FIG. 2, the projections 32 are embedded in the support means 20. In manufacturing the mounting plate 30 the mounting plate is stamped steel. The support means 20 is a plastic part molded about the projections 32 thereby resulting in a support means which is molded in mechanical interlocking engagement with the mounting plate 30. This type of support means provides a greater strength-to-weight ratio than prior art supports made of cast iron or zinc. Due to the molding process, no further machining is required.

As shown in FIG. 5, the projections 32 are L-shaped with a first leg 34 integral with the mounting plate 30 and extending therefrom in a direction perpendicular to a plane defined by the surface mounting plate 30. The projections 32 include a second leg 36 extending into the opening 18 and being substantially parallel to the plane defined by the surface of the mounting plate 30. This L-shaped configuration is included in the preferred embodiment and the flanges are disposed at the ends of slots extending radially from the periphery of the opening 18 and into the mounting plate. In this manner the projections may, in part, be made from part of the metal removed to define the opening 18.

As shown in FIG. 1, the support means 20 includes an outer periphery 38 engaging the wall 26 of the housing 24 adjacent the open end 28 thereof. In other words, the support means 20 is in close fitting engagement with the wall 26 of the housing 24; however, the instant invention is not limited by the shape of the housing 24 because the support means 20 can be molded to accommodate any shape which the housing 24 may assume. Therefore, the instant invention is not limited to merely a circular wall 26 but can be adapted for various wall constructions and designs.

As shown in FIG. 1, the driven means 14 includes a first driven shaft 40 extending from the motor 12 and bearing 42 for supporting the driven shaft 40. The driven means 14 also includes a second driven shaft 44 connected to or integral with the first shaft 40 for rotation thereby. In other words, the motor 12 drives the shaft 40 and the drive shaft 40 drives the second driven shaft 44. In the preferred embodiment shown in FIG. 1, shaft 44 may be a helix member having gear teeth thereon. The shaft 44 may mount into a gear box.

The support means 20 includes a first portion 46 of the passageway 22 having a diameter spaced from and surrounding the first driven shaft 40 and a second portion 48 of the passageway 22 engaging the bearing 42. In other words, a pocket is defined by the support means 20 for supporting the bearing 42. The sides of the pocket 48 (as shown in FIG. 2) can be adjusted through the molding process; therefore, the size of the pocket is not limited to solely that of the instant invention and it can be adjusted by the mold rather than by expensive machining once the pocket is made. Also during the molding process the pocket can be made to exact specifications.

The passageway 22 includes an outwardly tapered portion 50 extending from the first portion 46 of the passageway 22 as shown in FIG. 2. The first portion 46 of the passageway 22 is disposed between the outwardly tapered portion 50 and the second portion 48 of the passageway 22. The preferred embodiment of the support means 20 provides excellent concentricity with the motor 12 thereby limiting stresses on the assembly which would result from misalignment of the motor driven means 14.

As shown in FIG. 2, the second portion 48 of the passageway 22 includes an annular recess 52. As shown in FIG. 1, sealing means 54 is disposed in the recess 52 about the bearing 42 for perfecting a seal between the support means 20 and bearing 42. The sealing means 54 can be a circular O ring which can be press-fit around the bearing 42 to perfect a seal.

The support means 20 includes a second annular recess 56 in the outer periphery 38 thereof as shown in FIG. 2. Referring to FIG. 1, the support means 20 includes a second sealing means 58 disposed in the second recess 56 for perfecting a seal between the support means 20 and the wall 26 of the housing 24. In the case of seal 54, it may protrude from the face of the plate 30 so that when the assembly is united with a gear box, or the like, the seal 54 will also be in sealing engagement with a face of such a gear box, or the like.

The casing means 16 includes connection means generally indicated at 60 for connecting the mounting plate 30 to the housing 24. In the preferred embodiment of the instant invention shown in FIG. 1 the connection means 60 includes a radially extending flange portion 62 of the housing 24 having a plurality of holes 64 therethrough. The mounting plate 30 includes a second plurality of L-shaped projections 66. Each of the second plurality of L-shaped projections 66 have one leg integral with the mounting plate 30 and extend through one of the holes 64 in the flange portion 62. Each of the second plurality of L-shaped projections 66 have a second leg engaging the surface of the flange portion 62 which is opposite to that facing the mounting plate 30; therefore, the L-shaped projections 66 secure the mounting plate 30 to the housing 24. In constructing the housing assembly 24 the mounting plate 30 first includes projections 66 extending perpendicularly from the face of the mounting plate 30. The mounting plate 30 is secured to the housing 24 by inserting the projections 66 into the holes 64 in the flange portions 62. The projections 66 are then bent into the L-shape previously described thereby engaging the flange portion 62 and securing the mounting plate 30 to the housing 24. Since the instant invention provides a mounting plate made of stamped steel, alternative connection means can be utilized, such as, spot-welding the mounting plate 30 to the flange portion 62, thereby alleviating the necessity of using the projections 66.

The assembly may be constructed such that the second driven means 44 is either integral with the first driven means 40 or is driven at the same speed as the first driven means 40. In either case, the support means 20 provides a bearing pocket of sufficient strength for encasing a bearing for providing a bearing surface for the driven member 44.

As shown in FIG. 4, the mounting plate 30 includes a triangular upper portion 68 and a rectangular bottom portion 70. As shown in FIG. 3, the support means 20 is disposed in both the upper and lower portions (68, 70). As shown in FIG. 3, the mounting plate includes mounting holes 72 extending therethrough. The mounting holes receive screws or bolts therethrough for securing the motor assembly to a bulkhead or similar support structure.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motor assembly (10) comprising: a motor (12); driven means (14) extending from said motor (12); casing means (16) for encasing said motor (12) including a housing (24) having a wall (26) disposed about said motor (12) and having an open end (28), said casing means (16) including a mounting plate (30) adapted for mounting to a support structure and extending over said open end (28) of said housing (24) and attached to said housing (24), said mounting plate (30) including an opening (18) therein, said driven means (14) extending through said opening (18); and resilient support means (20) molded about portions of said mounting plate (30) in said opening (18) so that portions of said mounting plate (30) are embedded in said support means (20) for mechanical interlocking engagement therewith, said resilient support means (20) having a passageway (22) therethrough engaging and supporting said driven means (14), said support means (20) including an outer periphery (38) engaging the interior of said wall (26) of said housing (24) adjacent said open end (28) thereof so that said support means (20) extends from said mounting plate (30) into said housing (24) and engages said driven means (14) to close said open end (28) while attached to said mounting plate (30).

2. An assembly as set forth in claim 1 wherein said mounting plate (30) includes a plurality of projections (32) extending into said opening (18), said projections (32) being embedded in said support means (20).

3. An assembly as set forth in claim 2 wherein said projections (32) are L-shaped with a first leg (34) integral with said mounting plate (30) and extending in a direction perpendicular to a plane defined by the surface of said mounting plate (30) and a second leg (36) extending into said opening (18) and being substantially parallel to said plane.

4. An assembly as set forth in claim 1 wherein said driven means (14) includes a first driven shaft (40) extending from said motor (12), a bearing (42) for supporting said driven shaft (40), said support means (20) including a first portion (46) of said passageway (22) having a diameter spaced from and surrounding said first driven shaft (40) and a second portion (48) of said passageway (22) engaging said bearing (42).

5. An assembly as set forth in claim 4 wherein said passageway (22) includes an inwardly tapered portion (50), said first portion (46) of said passageway (22) being disposed between said inwardly tapered portion (50) and said second portion (48) of said passageway (22).

6. An assembly as set forth in claim 5 wherein said second portion (48) of said passageway (22) includes an annular recess (52) and including sealing means (54) disposed in said recess (52) about said bearing (42) for perfecting a seal between said support means (20) and said bearing (42).

7. An assembly as set forth in claim 6 wherein said support means (20) includes a second annular recess (56) in said outer periphery (38) thereof, and including a second sealing means (58) disposed in said second recess (56) for perfecting a seal between said support means (20) and said wall (26) of said housing (24).

8. An assembly as set forth in claim 7 wherein said casing means (16) includes connection means (60) for connecting said mounting plate (30) to said housing (24).

9. An assembly as set forth in claim 8 wherein said connection means (60) includes a radially extending flanged portion (62) of said housing (24) having a plurality of holes (64) therethrough and a second plurality of L-shaped projections (66), each of said second plurality of L-shaped projections (66) having one leg integral with said mounting plate (30) and extending through one of said holes (64) in said flanged portion (62), each of said second plurality of L-shaped projections (66) having a second leg engaging the surface of said flanged portion (62) which is opposite to that facing said mounting plate (30).

10. An assembly as set forth in claim 8 wherein said mounting plate (30) includes a triangular upper portion (68) and a rectangular bottom portion (70), said support means (20) being disposed in both of the upper (68) and lower (70) portions.

11. An assembly as set forth in claim 10 wherein said mounting plate (30) includes mounting holes (72) extending therethrough.

* * * * *